July 21, 1936.   A. J. FISHER   2,048,605
CLOSED CAR VENTILATION
Filed Nov. 28, 1932   5 Sheets-Sheet 3

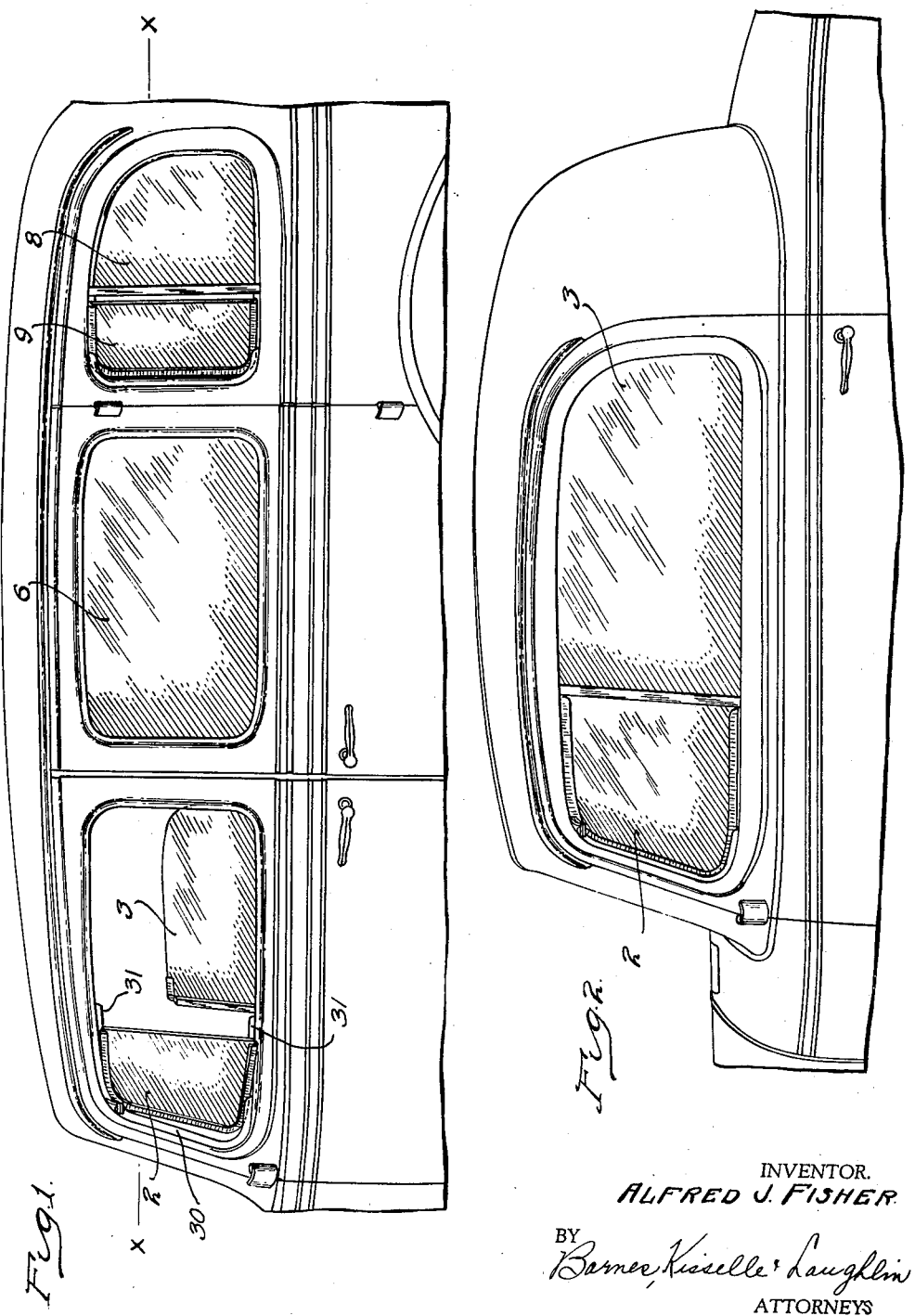

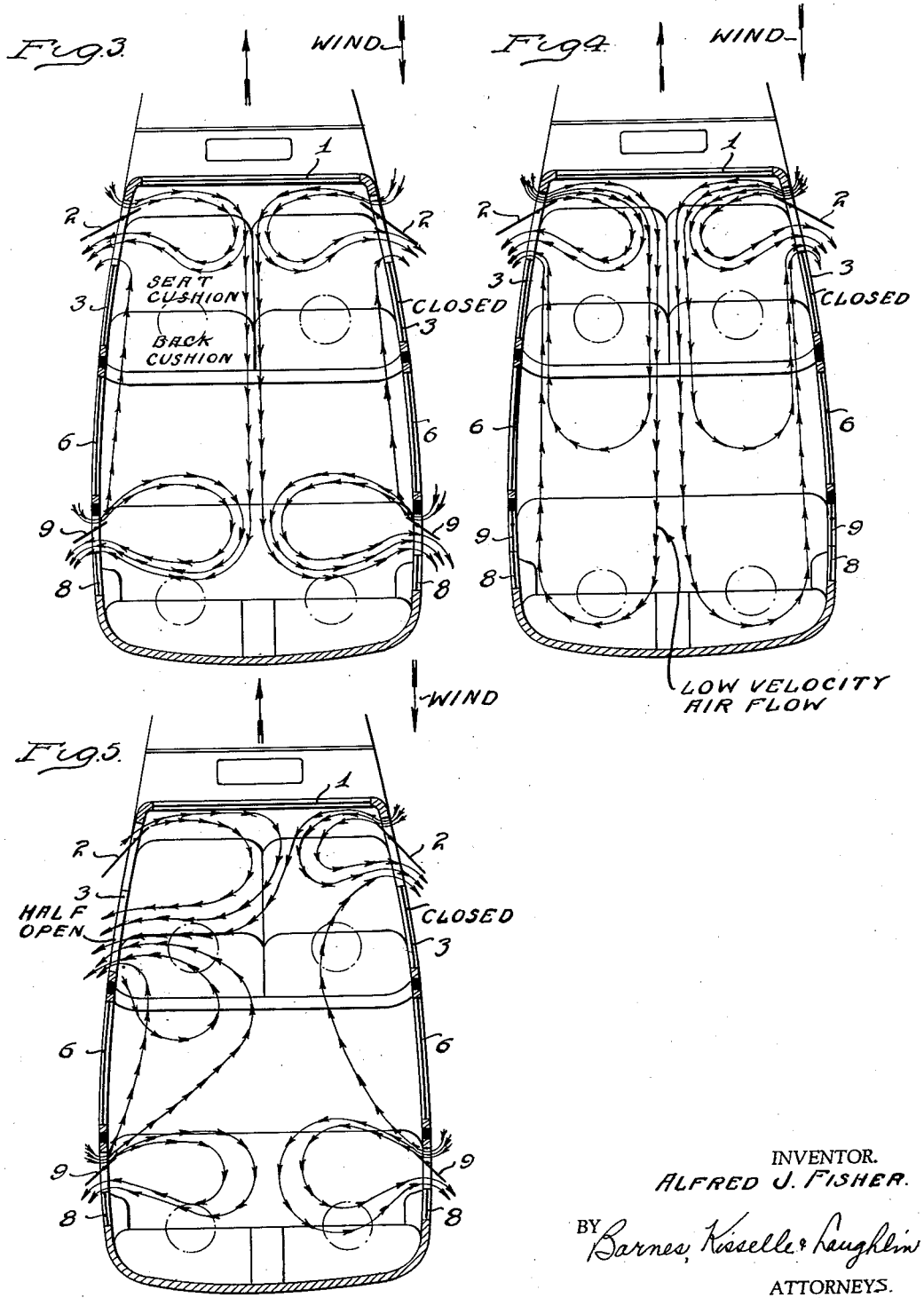

INVENTOR.
ALFRED J. FISHER.

BY Barnes, Kisselle & Laughlin
ATTORNEYS.

July 21, 1936. A. J. FISHER 2,048,605
CLOSED CAR VENTILATION
Filed Nov. 28, 1932 5 Sheets-Sheet 4
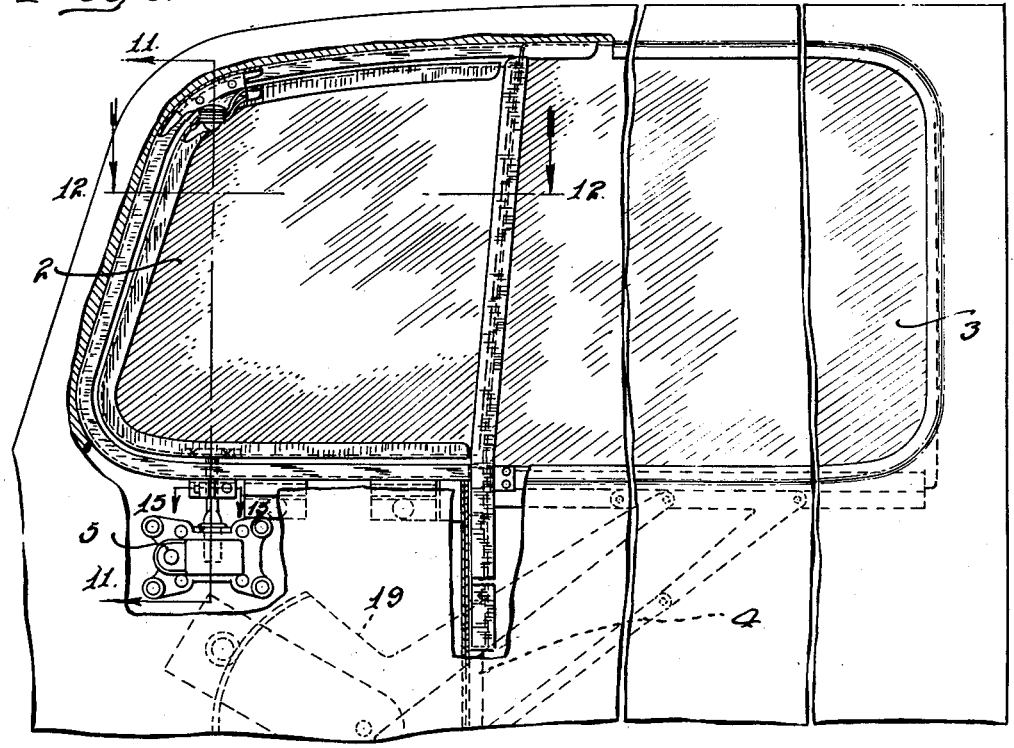
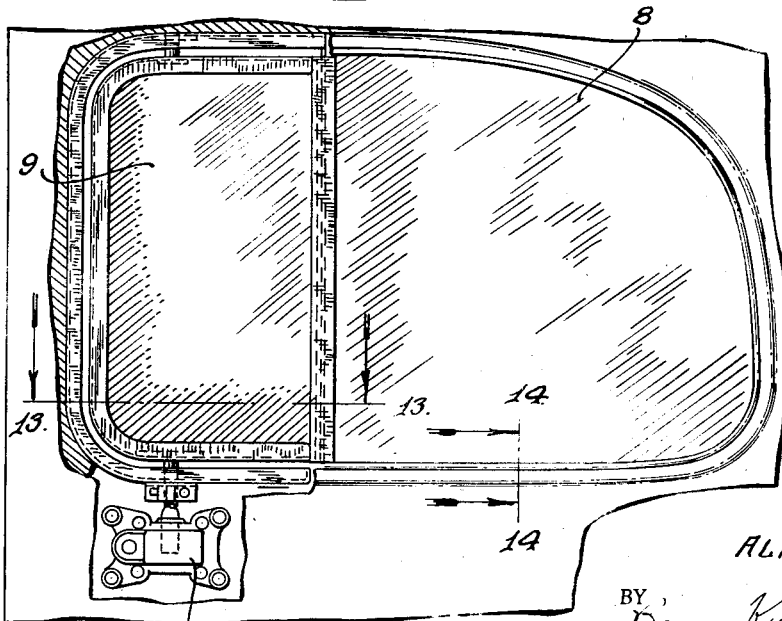
INVENTOR.
ALFRED J. FISHER
BY
ATTORNEYS.

July 21, 1936.                A. J. FISHER                2,048,605
                        CLOSED CAR VENTILATION
              Filed Nov. 28, 1932          5 Sheets-Sheet 5
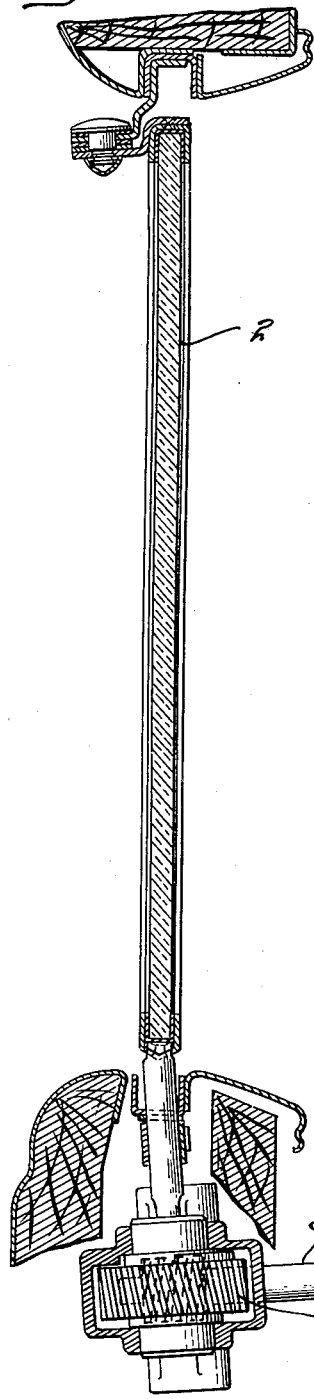
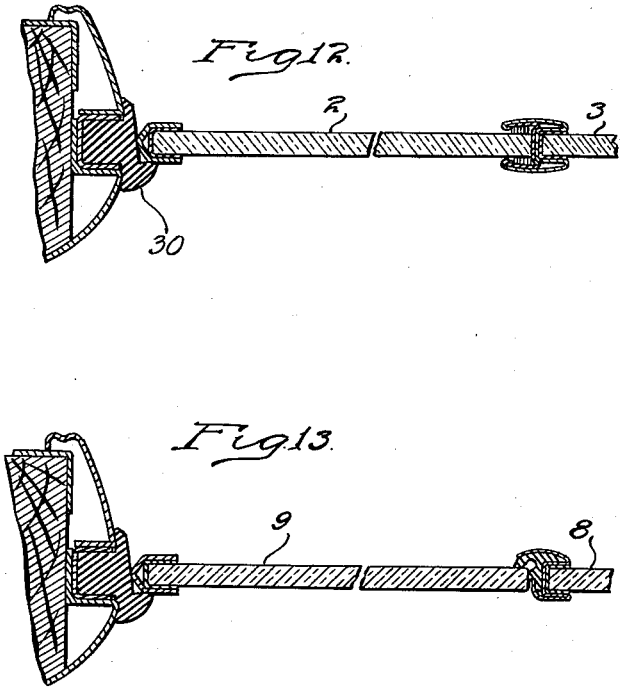
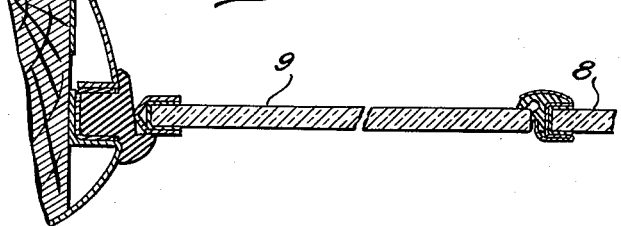
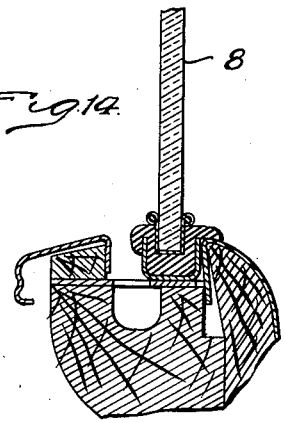
INVENTOR.
ALFRED J. FISHER.
BY Barnes, Kisselle & Laughlin
                    ATTORNEYS.

Patented July 21, 1936

2,048,605

UNITED STATES PATENT OFFICE 2,048,605

CLOSED CAR VENTILATION

Alfred J. Fisher, Detroit, Mich., assignor to Ternstedt Manufacturing Company, Detroit, Mich., a corporation of Michigan Application November 28, 1932, Serial No. 644,622

5 Claims. (Cl. 296—44)

This invention relates to closed car ventilation. It is the object of the invention to afford an arrangement of window panels for automobile closed bodies or other vehicle bodies, which will permit a very nicely controlled ventilation in a moving vehicle. In speaking of other vehicle bodies, I refer to railway cars, boats, airplanes, and other vehicles but the design and arrangement of the panels finds special utility in connection with automobile and bus bodies.

In referring to controlled ventilation by the panel adjustment, it may be stated that this new arrangement permits what is believed to be a better approximation to individual control of ventilation for each rider in a car than one has heretofore been able to achieve. It is well understood from experience, that a great deal of discomfort is now suffered in automobile riding, especially by guests, through an inability to control draft and air conditions in a car and a disinclination to complain to the driver or others in control of the car. The present panel system of controlled ventilation permits each individual under most conditions to fairly well approximate the ventilation which he desires and to counteract effects that he would otherwise be obliged to endure due to air currents or heat conditions which are under the control of companions in the car.

This new panel system of ventilation control is particularly useful in connection with the large capacity heaters that are now employed in many automobiles. Different people are susceptible to heat in varying degrees. Hence, some occupants of the car very often suffer considerably from an overheated car without being able to satisfactorily relieve their condition. The present invention permits this condition to be largely ameliorated if not completely solved.

Another condition in closed bodies, especially automobile bodies, that gives a great deal of trouble under certain conditions is the condensation and frosting on the windshield and some of the side windows. The present system of adjustable panel ventilation goes a long way in correcting these troublesome conditions and particularly on the windshield, as will be more fully explained hereinafter.

In the drawings:

Fig. 1 is an elevational view of a closed automobile body of the sedan type showing the adjustable panel system of ventilation.

Fig. 2 is a side elevation of a coupe equipped with the same.

Fig. 3 is a horizontal section (somewhat diagrammatic) through a sedan body showing all the swinging panels open and the other panels closed, with an effort to indicate by arrows what we believe to be the course of the air currents under normal wind conditions. This view is taken between the shoulder and the top of the head of a passenger of normal height about at the height $x$—$x$ on Fig. 1. The circles show approximately the position of the head of an occupant of the seat.

Fig. 4 is a similar view of a sedan showing conditions with both the rear swinging panels closed.

Fig. 5 is a similar view of a sedan with the swinging panels the same as shown in Fig. 3 but with the left sliding panel dropped about half way.

Figure 6:
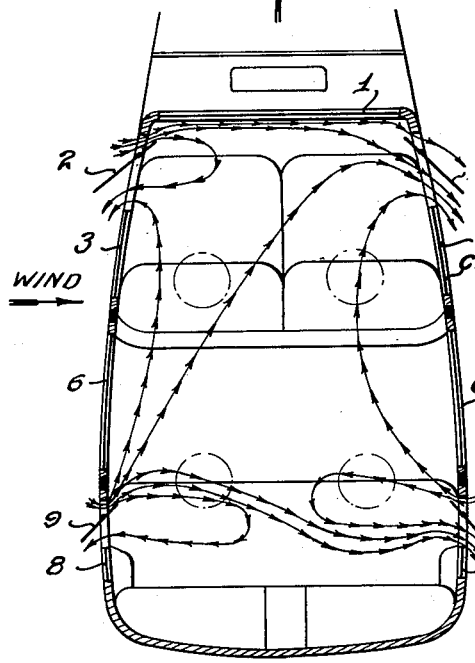

Fig. 6 is a similar view with the panels in the same condition as in Fig. 3 on a sedan body showing the air currents with a strong cross wind from the left.

Figure 7:
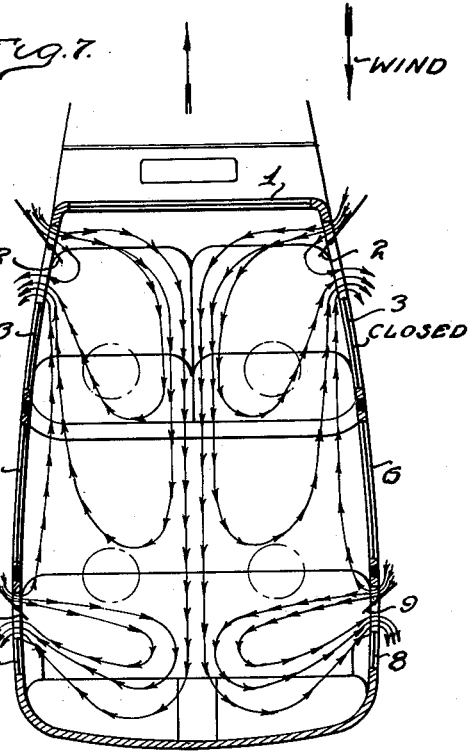

Fig. 7 is a similar view of a sedan type of body with the front swinging panels and the rear swinging panels each open to the scoop position for giving a large volume of air in extremely hot weather.

Figure 8:
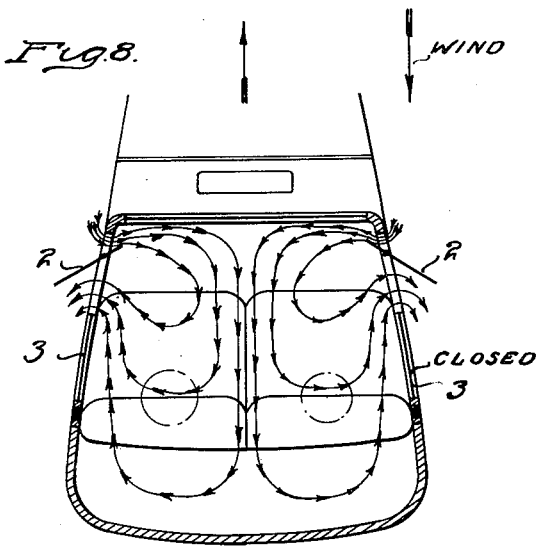

Fig. 8 is a horizontal section at the same height taken through a coupe with both sliding panels closed and both swinging panels open.

Fig. 9 is a side elevational view of a front window and the adjoining body structure, the same being partly in section and some of the body broken away to show the mechanical structure.

Fig. 10 is a fragmentary elevational view of one of the rear windows showing some of the body broken away.

Fig. 11 is a vertical section taken on the line 11—11 of Fig. 9.

Fig. 12 is a horizontal section on the line 12—12 of Fig. 9.

Fig. 13 is a horizontal section on the line 13—13 of Fig. 10.

Fig. 14 is a vertical section on the line 14—14 of Fig. 10.

Fig. 15 is a section on the line 15—15 of Fig. 9.

It will be understood that the above views are intended, as best one can, to portray conditions that are believed to exist in an automobile body where there are no cross winds, except in the one view, Fig. 6. It may be here observed that it is extremely difficult to plot the exact conditions and describe with accuracy everything that takes place. I believe that conditions approximating those indicated in the above mentioned figures do take place under certain adjustments of the panels and car speed but it is so hard to get exactly determined wind conditions and there are so many other factors involved that these air conditions shown in these drawings and about to be described must be taken more as the theory of what I believe takes place on the information that I now have than as an absolute guaranty of the exact facts. I have undertaken by actual demonstrations and tests to get as accurately as I may, in the time that I have had, the actual conditions. Whatever may be the final determination of precisely and exactly the air conditions in any given arrangement of the panels, it may be stated without fear of contradiction that these several swinging and sliding panels do cooperate together in a very pronounced way in modifying the air conditions in the different parts of the car.

Referring to the drawings, I represents the windshield, 2 is a front panel swinging on a substantially vertical axis and located at the front and side of the car. This front panel will ordinarily be in the front portion of the forward door window opening. There is one of these panels preferably on each side of the body. To the immediate rear of this in the same opening and completing the closure of the opening when the two panels are closed, is a sliding pane 3. This is slidable up and down in the window opening and in the window well 4 in the customary way and is controlled by a window regulator 19. This window regulator has the usual locking device so as to keep the sliding panel in any desired position of adjustment. Preferably the swinging panel is also controlled by a window regulator 5 of the worm and worm gear type, which is irreversible, and the details of which need not be shown but which will be readily understood. The handle shaft is 5a but the handle is not shown.

In Fig. 15 a friction clamp is shown, consisting of the spring-pressed half sleeve 20. This cooperates with the regulator 5 to prevent the vibration of the swinging panel due to any slack in the regulator, which is a worm and worm gear.

Preferably the sliding panel and the swinging panel will at the closed position of the swinging panel occupy substantially the same plane as shown in Fig. 12 but this is not absolutely necessary. The window stop strip 30 shown in Fig. 12, and particularly the strips 30 and 31 shown in Figs. 1 and 2, serve to stop the front section of the panel swinging outwardly and the rear section of the panel swing inwardly. This serves to line up the panels in the same plane as shown in Fig. 12. The sliding panel has at its front edge an H-channel and the two adjacent panel edges are slightly inclined rearwardly from bottom to top. Hence, when the sliding panel is dropped it, therefore, drops away from swinging panel, as shown in Fig. 1.

In the rear door window openings, I preferably use only the usual sliding panel 6 controlled by a window regulator although it must be understood that I do not limit myself to such a panel.

The rear window opening preferably on each side comprises at the rear preferably a stationary window panel 8, although it would be permissible to use a sliding window panel here. However, the additional desirable results obtained under ordinary conditions hardly make it worth while as in most bodies the rear sliding window can only be lowered part way on account of the wheel housing and it is found that the ventilation afforded by the swinging panel is sufficient under almost all conditions to take care of all the desires of the occupants of the rear seat.

Forward of this rear panel and preferably in the same plane is a panel 9 swinging on a substantially vertical axis and which can be opened to varying angles and which may be turned around to the scoop position to get a blast of air on the occupants of the rear seat. This panel is preferably controlled by a window regulator 7.

Preferably the windshield is fixed. In a great many cars heretofore the windshield is raised and lowered into the header. This has given a useful type of ventilation especially when used with a trough-like member that can turn part of the air down behind the instrument board and into the lower part of the front compartment. I find with my improved system of ventilation that there is no need of using a windshield at all for ventilation and this eliminates a number of constructional problems occurring in the modern closed body. It allows the use of glass to a higher point in front of the driver.

A cowl ventilator may or may not be used. I find that with a front ventilator such as we have described, an air stream is directed forward upon the windshield which is inclined from top to bottom and that there is a tendency to throw a considerable amount of air down into the front compartment near the floor.

The swinging panel 2 is so pivoted in view of the shape and dimensions of the panel that a considerably major portion of the panel is to the rear of the pivot when the window is closed. In the illustrated swinging panels this objective is obtained by pivoting forward of the central position and also due to the slant of the panel along the front edge. The panel is capable of adjustment to numerous positions up to the final position shown in Fig. 7 which is somewhat forward of the 90° position. All the angular positions mentioned are measured from the longitudinal center line of the vehicle on an arc to the rear of the pivots.

When the rear edge of the panel has been adjusted out to the position 45° with respect to the center line of the vehicle, I find that whatever air is drawn in at the front of the panel is not large in volume nor in velocity. I believe that practically all but a very negligible amount of the air is caused to flow into the interior by reason of the extractor effect at the rear of the panel and air leaks in the side of the body as the vehicle moves through the atmosphere. However, beginning somewhere near the 60° position, I find that there is a start of a range of positions wherein the air velocity and volume coming through and at the front of the panel increase very rapidly as the panel passes from one position to another at a slightly increased angle. This happens up to approximately the 90° to 110° positions. This result is particularly true with the pivoting of the panel arranged as shown in the drawings. Such pivoting assures a substantially major portion of the panel area being located to the rear of the pivots. The reason for this rapid increase in velocity and volume of air passing through the opening at the front of the panel is, I believe, due to the fact that this major portion of the panel is thrust out into the air stream as the vehicle passes through the atmosphere. This projecting rear panel section because of its area relatively larger than the front section arrests or splits off a body of air of considerably greater cross section than the area of the opening at the front of the panel. The faster the vehicle is going, the greater the pressure which will be built up against the outwardly projecting panel section and the farther the panel projects out into the air stream, the greater will be the pressure due to the fact that the strong air current which is being deflected around the windshield is deflected out somewhat from the side of the vehicle. Some of this air thus arrested and thus under pressure tends to spill off the edges of the shield but a considerable portion of it tends to pass through the opening at the front of the panel. There are, I believe, two factors working to pass a considerable portion through this opening. One is the subatmospheric pressure in the vehicle due in part to the extractor affect of air being drawn out at the rear of the panel and in part due to air leaks in the body. The other factor is the tendency of the air to be deflected through this opening. Even when the panel is at say the 70° position, there is a very considerable tendency to deflect the air through this opening. This is due to the air when striking the panel being diverted, part of it in an inward direction. This larger volume of air under pressure can only pass through the opening which is smaller by changing the pressure into velocity. This, I believe, is what actually takes place as it is found that the velocity very much increases as the panel passes, say from the 60° angularity up to the 90° angularity. From about 110° on the velocity, I believe, actually decreases. Of course, the greater the velocity of the air passing through the opening, the greater the volume.

At 45° or less degree positions, the ventilation is almost entirely indirect, that is, the operation is by drawing in a small amount of air with small velocity due to the extractor effect at the rear of the panel. As the angularity of the panel increases, especially at about the 60° position up to and somewhat beyond the 90° position, there is a mechanical deflection of the air into the vehicle which is direct ventilation. This brings into the body a very much greater volume of air and a very much greater velocity than is possible by the suction effect alone. This direct deflection of the air into the vehicle affords a suitable substitute for air that is ordinarily brought into the body through an open windshield. My arrangement permits the use of a fixed windshield, which is cheaper to construct and much easier to make air and water tight.

In normal summer weather, the 90° or position of somewhat less angularity will afford all the air desired and yet not blow directly in the face of the occupant of the car, but in extremely hot weather, the occupant of the seat can get the high velocity blast directly in his face by turning it to such a position as shown in Fig. 7.

I find that by using such a panel pivoted on an "intermediate axis" and in connection with a sliding complementary panel, that it is possible to very nicely control the air circulation near or about the occupant of the seat immediately adjacent the window opening, as shown in Fig. 3, where the sliding complementary panel is in its full raised position and the swinging panel is swung to a rearwardly angling position. A loop of fast (how fast will depend upon the speed of the vehicle and the angularity of the panel) moving air will be created in front of the occupant of the seat (occupant indicated by dot and dash circle). This is nicely shown in Figs. 3 and 4. However, there will be also some air circulating towards the rear, as is shown in Figs. 3 and 4, and particularly in Fig. 4, where this air will drift toward the rear and then be drawn forward along the side of the car when the rear ventilator is not open. However, the amount and velocity of this air is so much less than the loop that it does not ordinarily create an objectional draft.

Of course, there will be conditions in which this front loop will not be as well attained on one side of the car as when there is a considerable side wind as shown in Fig. 6. The side wind will blow the incoming air just to the rear of the windshield clear across the car and out the front of the opposite swinging panel. This I believe is caused by the force of the air coming in from the windward side and also in a measure by the aspirating effect of this side wind blowing over the top of the car and tending to exhaust air from the front of the swinging panel on the leeward side.

This well defined loop (as shown in Figs. 3 and 4) at the front of the occupant of the front seat provides a strong current of fresh air but in such a position that it does not adversely affect the occupant of the seat. It furnishes the needed fresh air without a draft really blowing on his head and it affords a strong suction to draw foul air and smoke out of the compartment. Now, if it happens that the day is rather warm or the heater of the car has made the car oppressively hot, the occupant of the seat may very nicely regulate this loop to turn somewhat of a draft or a blast of air on himself. Of course, he may more or less regulate the air by the swinging of the front panel but the throwing of this loop of air directly onto the occupant can be achieved by the lowering of the sliding panel. By lowering the sliding panel two things occur to give the occupant of the seat more of this fresh air. One is that the outlet of the loop is broadened and thus consequently tending to diffuse the loop and bring it around the occupant of the seat. Secondly, the outlet of the air is increased in size and, consequently the aspirating effect tends to draw more air out of the car and consequently more air is drawn in at the front of the swinging ventilator. The only way more air can be drawn in here is by increasing the velocity. Hence the velocity of the air is increased. We have found in our experiments that this velocity and diffusion of the air increases quite measurably until the sliding panel is dropped to the half way position. From there on there is not a great deal of increase. The reason for this we believe to be that the air coming diagonally upward from under the swinging panel nullifies the aspirating effect here and also tends to resist the air coming out of the interior of the body. With the rear ventilator open, some of the diffusion and air current on the front seat occupant appears to come from the rear ventilator opening or openings, (as shown in Fig. 5) but with this or these closed, the front loop appears to diffuse into a wider band and afford substantially all the air around the seat occupant.

It is apparent from the above description that this loop system of air diffusion at the front can under ordinary driving conditions be used by each individual occupant of the front seat to get the proper amount of air that he wants without materially affecting other occupants. It will also appear that this is an "individually controlled ventilation" and that this can be nicely regulated by both swinging the front ventilator and by raising and lowering the complementary sliding window.

Another thing of extreme importance should be mentioned here, that in very cold weather the breath or moisture in the car often tends to condense and even freeze on the windshield and obscures the vision. By opening the ventilator, a loop is formed which travels directly along the windshield on the inside and tends to prevent condensation and freezing.

The rear swinging panels have a very important function also. From experiments and tests, it would seem that a very heavy current of air comes in at the front of this rear ventilator. In fact, one would hardly believe this to be the case until he had actually witnessed it. Part of this air appears to form a loop (on the same principle just above explained) and be drawn out of the rear ventilating panel. The amount of this air and just how close it comes to the occupant of the rear seat can be largely determined by this occupant by how much he opens the swinging panel. He can actually get it to blow on him by approximating the right angle to direction of travel position or by turning the panel to the scoop position. Or he can get fresh air immediately in front of him and draw out the foul air of the car or smoke, without any substantial draft by keeping the swinging pane more nearly to the closed position.

A part of the air that comes in at the front of the rear ventilator travels forward in the car and is drawn out through the front window opening. At least this air travels forward in the car when there is an opening through the front window. The amount of air that travels forward in the car and the position of the forward travelling column can be measurably regulated by the occupant of the front seat. If, with this front sliding window all the way down or part of the way down, the occupant of the front seat is getting too much air from the rear, he can measurably protect himself by raising or closing his sliding window. This will decrease the amount of air drawn out the front window of the car, and, consequently, will decrease the amount of air that is drawn through the front of the rear ventilator as well as the amount of the air drawn through the front opening at the front ventilator. This, of course, decreases the velocity and the air current. At the same time, the lowered velocity tends to throw the forward moving current of air not so much toward the center of the car. This alleviates the draft on the back of the neck and the air clings closer to the side of the car as is shown in some of the views.

The occupant of the rear seat may in a measure protect himself from drafts coming from the front openings. Air travelling back from the open front window can be drawn out (as is shown in Fig. 3) through the rear loop in place of circulating around back of the head of the occupant of the rear seat, as shown in Fig. 4. This, of course, is not an absolute bar to drafts where the air coming from the front is strong but it is found to be very helpful in this connection.

Of course, with heavy cross winds the several conditions above described will often be upset. Some of the results of a cross wind are indicated in Fig. 6. By properly adjusting the panels, both swinging and sliding, the occupants of the seats may in a large measure protect themselves from drafts or secure the air that they desire. Adjustment will have to be made under each condition according to the direction of the wind, the speed of the car, etc., and it cannot be laid out with accuracy, but is largely a matter of cut and try, when the occupant is confronted with a given condition.

In a coupe or body using only two windows on the side, I find it unnecessary to use the rear swinging panel although it is possible to use this ventilator with measurably good results. The difficulty, however, is that the rear swinging panel at the front of the rear window opening in a two window job produces a direct draft on the back of the neck of the occupant of the front seat. He is so close to the entry of the air that the control is not so efficacious.

As previously stated, the above layout of air currents, control, etc., is believed to be an approximately correct one, under the conditions obtained in my tests, but the air currents are so hard to accurately plot and the wind conditions are so varied that I do not want to be understood as saying that somewhat different conditions may not be found under a longer series of tests or under better observation conditions. Nevertheless, I believe that I can say with assurance that the conditions of the currents, the forms of the front air loop, and its shape, can be controlled by the adjustment of the sliding window and that the sliding window can also be used to control air currents coming from the rear ventilator on the same side and in fact coming from the rear ventilator on the other side of the car when there is a cross wind. And I know that the volume and velocity of the air coming through the front opening can be controlled by the angularity of the swinging panel, depending of course also on the speed of the vehicle.

In the claims, reference is made to a closed-body wall structure. This, of course, should be taken to include cabriolets and so-called convertibles, which are closed bodies in every sense of the word when their tops are up. "Window opening" when used in the claims, should be taken to mean the conventional type of window opening in a body structure of the closed type which may or may not include a divisional channel between the panel sections such as a permanent division channel shown in connection with the rear windows. See Figures 10 and 13.

The word "intermediate" is used in the claims to refer to the axis about which the swinging panel turns and is intended to cover a construction in which this axis is fairly close at the top to the front edge as is shown in the drawings of this application as well as other positions of the intermediate axis which will accomplish the purpose described in the specification.

In the claims reference is made to "substantially 90° or more to the longitudinal center line of the vehicle" or words to similar effect. As stated above in the specification, I find that a substantial increase in the velocity and air flow through the front opening begins somewhere around 60° to the center line of the vehicle as the panel is swung to bring the rear section outwardly. From this point up to the very near 90° position, I believe that there is a very substantial and rapid increase of both volume and velocity due largely to the mechanical deflection of the air into this opening. My present tests indicate that even at 80° and less a relatively large volume and velocity of air is thus obtained. Hence, when I state "substantially 90°" in the claims, I desire it to be understood that these are words of some latitude and that a fair range on either side of 90° is to be permitted by the use of the word "substantially"—such a range as will permit in a large measure the accomplishment of substantially the same or equivalent results as will be accomplished at exactly the 90° point.

No attempt is made herein to claim the H-channel by which the two movable panels are locked together when in closed position nor the weatherstripping nor the unit assembly of the weatherstrip carrier and the swinging panel as this is the subject matter of a co-pending application of Emory G. Simpson, Serial No. 618,188, filed June 20, 1932. The window regulator per se is claimed in the co-pending application of Herbert C. Field and Benjamin H. Bowlus, Serial No. 670,248, filed May 10, 1933, Patent 1,996,572, issued April 2, 1935.

What I claim is:

1. In a vehicle body, the combination with a closed body-wall structure including a window opening and well therebelow, of a panel supported in the front of the window opening on pivots to swing on an up and down axis substantially forward of the midpoint of the widest portion of the panel to provide a substantially major area of the panel to the rear of the pivot, means by which the panel is prevented from turning front edge outwardly and the rear edge inwardly from closed position, the said panel being adjustable on said pivots to bring the rear section outwardly and held against undesired actuation in any of numerous angular positions up to substantially 90° (measured on an arc to the rear of said panel axis) or more to the longitudinal center line of the car, and an upwardly and downwardly adjustable rear panel complementing said front panel and adapted to fill the space left in said window opening when the front panel is in closed position thereby forming a composite window opening closure.

2. In a vehicle body, the combination with a closed-body wall structure including a window opening and well therebelow, of a panel located in the front of the window opening, pivots supporting the panel to swing on an intermediate up and down axis so located and the panel and window opening so shaped and dimensioned that a substantially major part of the panel area when the panel is closed lies to the rear of the axis on which it turns, the said panel being swingable the rear section outwardly to holdable positions up to a final angular position substantially 90° or more to the longitudinal center line of the vehicle measured on an arc at the rear of the panel axis, whereby in positions near the outward limit of projection a large body of air is by the panel arrested and deflected through the small opening at the front of the panel, and an upwardly and downwardly adjustable rear panel complementing said front panel in the rear of said opening and forming therewith a composite window opening closure.

3. In a vehicle body, the combination of a closed-body structure including a fixed windshield incapable of opening and a front window opening immediately behind the windshield in the side of the body, a panel located in the front of the opening and arranged to swing the rear edge outwardly and the front edge inwardly on an intermediate up and down axis dividing the panel into a forward portion of substantially minor area and a rear portion of substantially major area and swingable on such axis to any one of numerous positions to provide openings one at the front allowing air to enter along the rear of the fixed windshield and one at the rear of the panel, the final outward position having the panel positioned substantially 90° or more to the longitudinal center line of the vehicle when measured on an arc to the rear of the panel axis, whereby in any one of the extreme outer positions of the panel air is forcibly deflected directly to the interior of the body immediately behind the windshield to substitute for air that normally comes through the open windshield when the vehicle travels through the atmosphere, means for holding said swinging panel at the various positions of adjustment, and a second upwardly and downwardly adjustable panel to the rear of the swinging panel and occupying only the rear part of the window opening left by the swinging panel when it is closed and forming therewith a composite window opening closure.

4. In a vehicle body, the combination of a closed-body structure including a windshield and a side door immediately to the rear of the windshield, said door provided with a window opening which is likewise immediately behind the windshield and provided with a window well below the opening, a panel pivoted in the front of the opening and arranged to swing on an intermediate up and down axis which is so arranged with respect to the panel as to provide a considerably major area of the panel to the rear of the pivot, said panel arranged to swing to any one of numerous positions and some of the final positions wherein the rear edge is outwardly of the window opening and the panel is subsubstantially 90° or more to the longitudinal center line of the vehicle when measured to the rear of the pivots, means for holding said panel at the various positions of adjustment, and a second upwardly and downwardly adjustable panel to the rear of and complementing the swinging panel and forming with the swinging panel a composite closure for the window opening.

5. In a vehicle body, the combination with a closed-body wall structure including a window opening and well therebelow, a panel located in the front of the window opening, pivots supporting the panel to swing on an intermediate up and down axis so located and the panel and window opening so shaped and dimensioned that a considerably major part of the panel area when the panel is closed lies to the rear of the axis on which it turns, the said panel being swingable through more than 90° to bring the rear major section of the panel outwardly to holdable positions beyond the position perpendicular to the center line of the vehicle, whereby in holdable positions approximating the 90° position air is forced through the opening at the front of the panel in relatively large volume and high velocity when the car is traveling at relatively good speed and whereby in the positions somewhat beyond the 90° position with the rear section of the panel pointing forward, a blast of high velocity air is turned directly on the occupant of the seat, and an upwardly and downwardly adjustable rear panel complementing said front panel and adapted to fill the space left in said window opening when the front panel is in closed position whereby forming a composite window opening closure.

ALFRED J. FISHER.